United States Patent
Karasch et al.

(10) Patent No.: US 9,248,714 B2
(45) Date of Patent: *Feb. 2, 2016

(54) ADAPTER WITH S-CAM

(71) Applicant: Pulliam Enterprises, Inc., Mishawaka, IN (US)

(72) Inventors: James M. Karasch, Elkhart, IN (US); William A. Aske, Union, MI (US); Randall A. Pulliam, Mishawaka, IN (US)

(73) Assignee: Pulliam Enterprises, Inc., Mishawaka, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,725

(22) Filed: Oct. 7, 2014

(65) Prior Publication Data

US 2015/0021879 A1 Jan. 22, 2015

Related U.S. Application Data

(63) Continuation-in-part of application No. 13/970,126, filed on Aug. 19, 2013, now Pat. No. 8,876,142.

(60) Provisional application No. 61/684,360, filed on Aug. 17, 2012.

(51) Int. Cl.
*B60D 1/52* (2006.01)
*B60D 1/07* (2006.01)
*B60D 1/48* (2006.01)

(52) U.S. Cl.
CPC *B60D 1/52* (2013.01); *B60D 1/075* (2013.01); *B60D 1/488* (2013.01); *Y10T 403/592* (2015.01)

(58) Field of Classification Search
CPC .......... B60D 1/52; B60D 1/07; B62D 53/0828
USPC ................................ 280/491.5, 901
See application file for complete search history.

(56) References Cited

U.S. PATENT DOCUMENTS

| | | | |
|---|---|---|---|
| 4,201,400 A * | 5/1980 | Hoogenbosch | 280/511 |
| 6,616,168 B2 * | 9/2003 | Belinky | 280/511 |
| 8,011,685 B2 * | 9/2011 | Belinky et al. | 280/511 |
| 8,876,142 B1 * | 11/2014 | Karasch et al. | 280/495 |
| 8,955,866 B2 * | 2/2015 | Bowe | 280/511 |
| 2005/0104326 A1 * | 5/2005 | Hord et al. | 280/511 |

* cited by examiner

*Primary Examiner* — Kevin Hurley
(74) *Attorney, Agent, or Firm* — Botkin & Hall, LLP

(57) ABSTRACT

An adapter which serves as an anchor point for coupling a trailer to a vehicle. The adapter adapted for mating in the socket of the vehicle. The adapter rotatable between a locked and an unlocked position. The adapter including a locking member which, when rotated, moves a follower partially through an aperture, partially extending into the socket thereby locking the adapter within the socket.

7 Claims, 16 Drawing Sheets

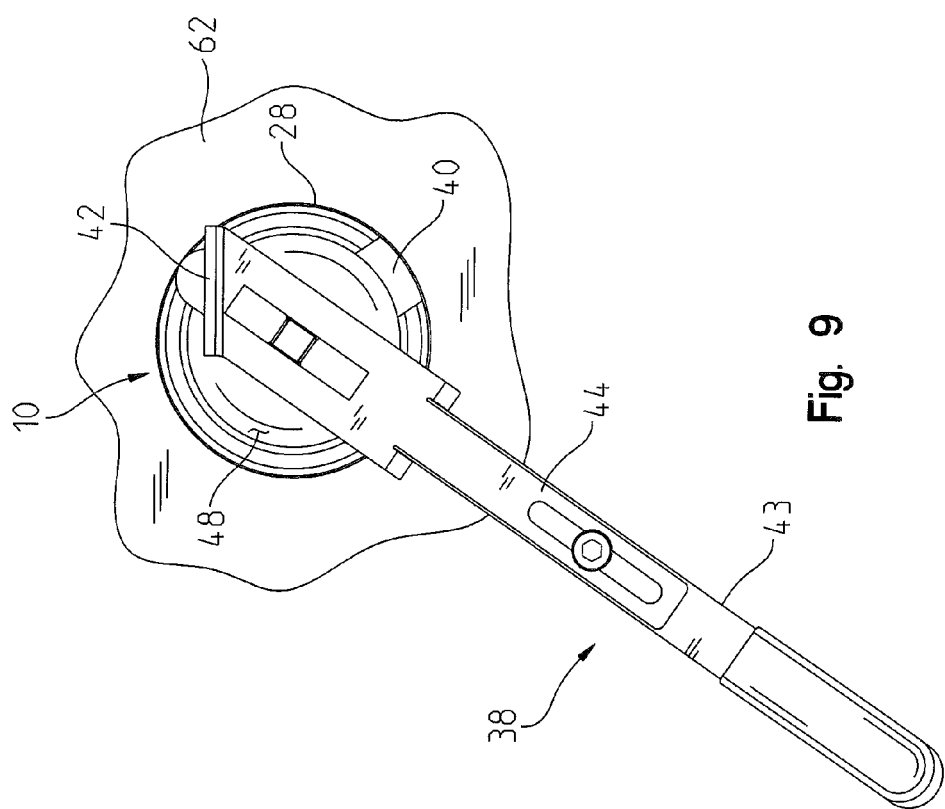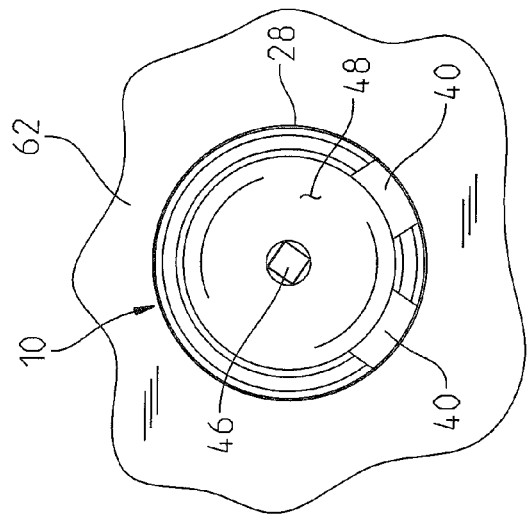

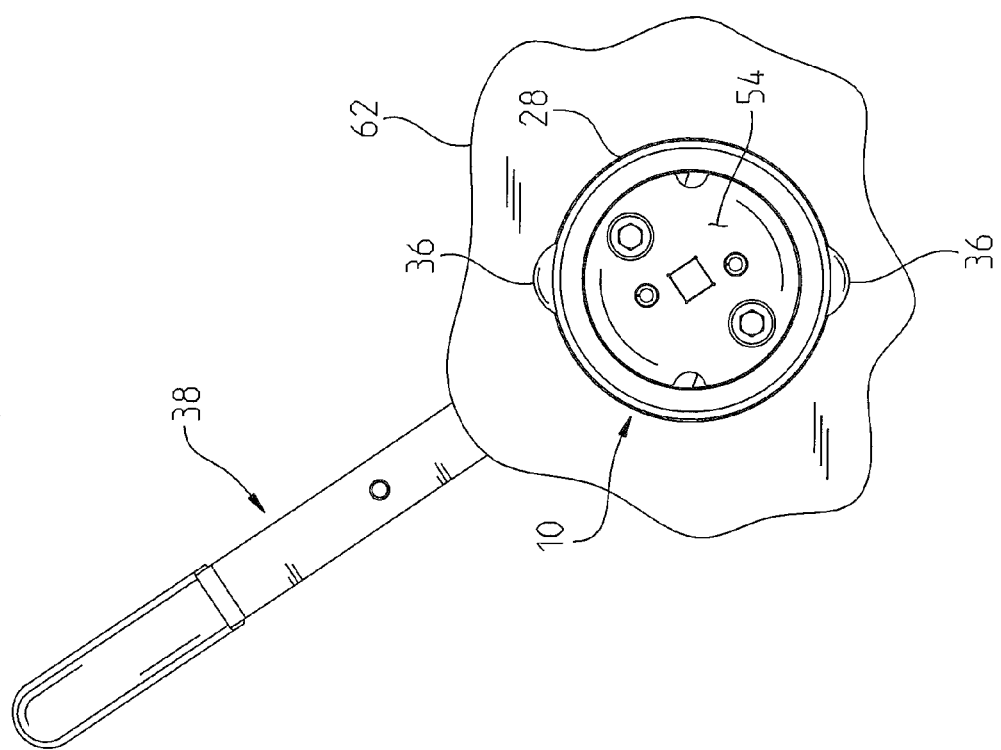

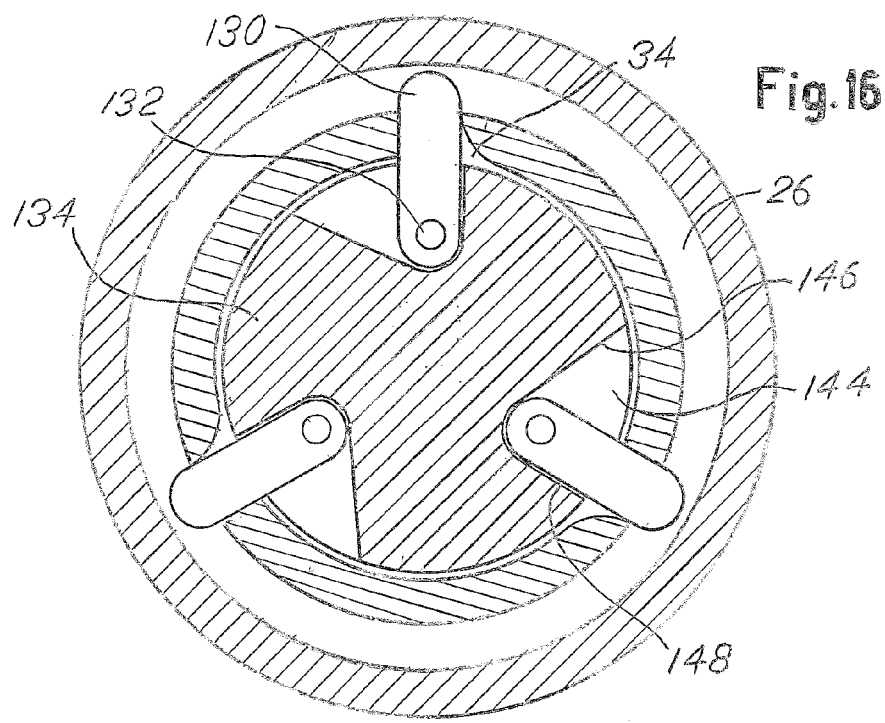
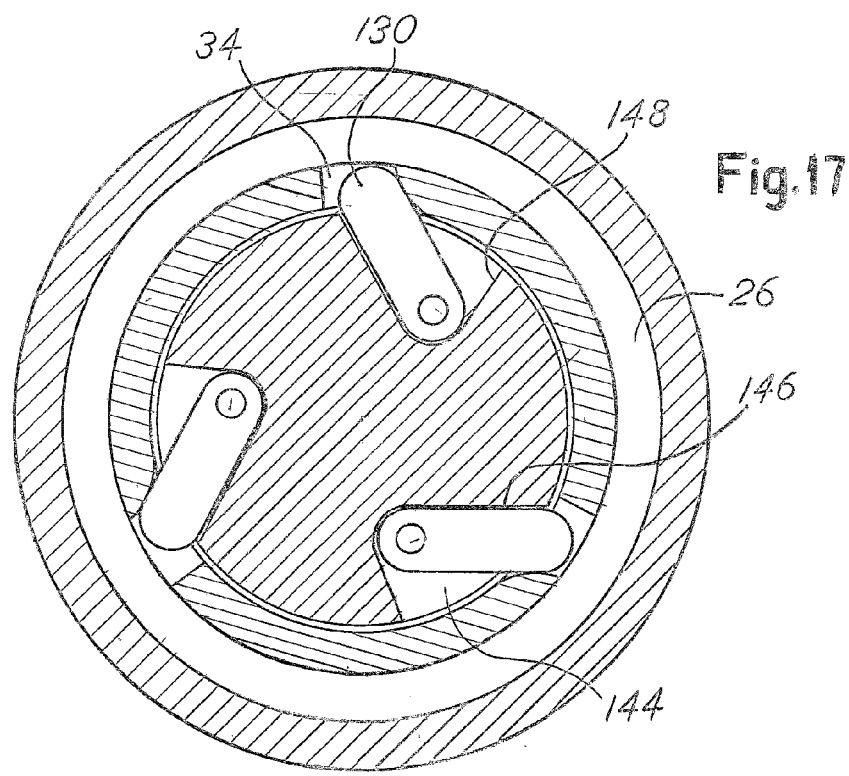

ADAPTER WITH S-CAM

CROSS REFERENCE TO RELATED APPLICATIONS

This application is a Continuation-in-Part of U.S. application Ser. No. 13/970,126 filed Aug. 19, 2013, the disclosure of which is hereby incorporated by reference.

BACKGROUND OF THE INVENTION

It is common practice for vehicles to be used for towing trailers. Trailers are coupled to towing vehicles in a multitude of ways, including through the use of a socket structure positioned above the rear axle of the vehicle. Such socket structure is often formed into the bed of the vehicle. The socket structure is adapted for accepting an adapter with the adapter adapted for securing a hitch to the vehicle. In this way, the socket structure serves as an anchor point for holding a hitch to a vehicle.

The hitch is adapted for coupling to a trailer. The hitch can be one of many types known in the art, such as fifth-wheel or ball. The trailer will include a member suitable for coupling with the hitch, such as a king pin or tongue.

The hitch is either formed integrally with the adapter or is connectable to the adapter such that in either case the socket structure secures the hitch to the towing vehicle.

Previous adapters have relied on a plunger as a locking mechanism to secure the adapter in the socket structure. The present discloser describes an improved adapter. The present adapter is designed such that when a trailer is coupled to the hitch, the adapter must be locked in the socket.

SUMMARY OF THE INVENTION

This disclosure describes an adapter suitable for being locked within the socket structure of a vehicle. The socket is formed integrally with the vehicle and is adapted for supporting a trailer behind the vehicle. The adapter is formed having a collar which houses a locking mechanism. The locking mechanism is disposed within the collar. An arm extends from the collar and is in rotational contact with the locking mechanism, such that rotation of the arm moves the locking mechanism between a locked and an unlocked position. The locking mechanism is formed having a cam, preferably an S-cam, having a shaft passing through the center of the S-cam, which shaft transfers rotative motion between the arm and the S-cam. The collar includes an aperture proximate the S-cam. The S-cam includes a camming surface defined by a shallow recess and a deep recess. As the S-cam is rotated, a follower moves between the shallow recess and the deep recess. The locked position is defined by the follower forming an interference fit with the shallow recess and the aperture, with a portion of the follower extending beyond the aperture. A cavity is formed in the socket, such that when in the locked position, the follower partially extends into the cavity and prevents the adapter from being removed from the socket. The unlocked position is defined by the follower nested against the deep recess and recessed from the socket's cavity, thereby allowing the adapter to be inserted in or withdrawn from the socket.

The upper rim of the collar is castellated, such that the rim includes notches with a first notch defining a locked position and a second notch defining an unlocked position. With the arm rested in the first notch the locking mechanism is prevented from rotating. The arm may be pulled up and away from the first notch and rotated to the second notch to unlock the locking mechanism.

The arm also includes a tab which serves as a secondary locking device. The tab extends uprightly from one end of the arm, and engages a portion of the hitch assembly. The tab is configured such that the hitch assembly can only be installed when the locking mechanism is in the locked position. The tab is also configured such that with the hitch assembly installed, the locking mechanism cannot be moved to the unlocked position—the tab forms an interference fit with the hitch assembly in such a way that the arm cannot be rotated to the unlocked position with the hitch installed. In this way, the tab serves to prevent the adapter from coming free from the socket when the hitch assembly is mounted to the adapter.

BRIEF DESCRIPTION OF THE DRAWINGS

A preferred embodiment of this invention has been chosen wherein:

FIG. 9 is a top view of the adapter and socket;

FIG. 10 is a top view of the adapter as seated in the socket with the arm removed to show the notches;

FIG. 11 is a bottom view of the adapter as seated in the socket with the vehicle cutaway to show the arm;

FIG. 16 is a cross-sectional view of an alternate embodiment in the locked position;

FIG. 17 is a cross-sectional view of the embodiment of FIG. 16 in the unlocked position;

DESCRIPTION OF THE PREFERRED EMBODIMENT

The present disclosure describes an adapter 10 suitable for securing a hitch assembly 12 in a socket 14, as shown in FIGS.

Figure 3:
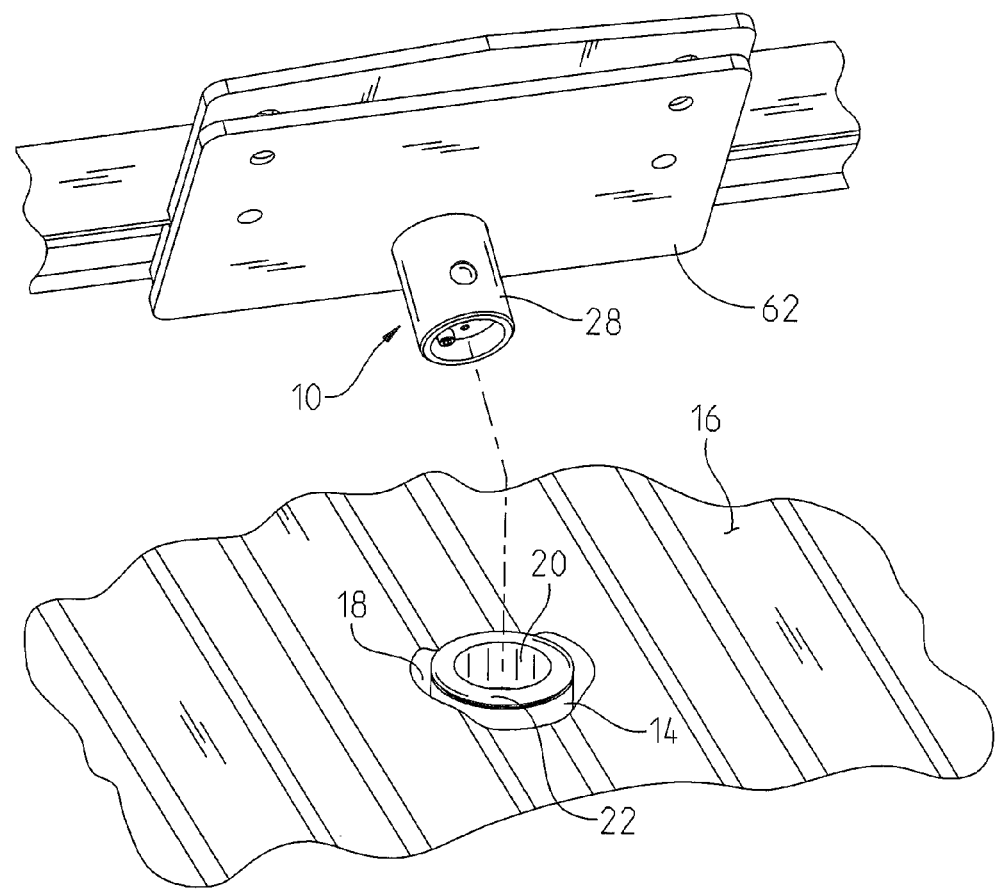
FIG. 3 is a perspective view showing the adapter and hitch assembly positioned above the socket.

1 and 2, of a towing vehicle (not shown). Hitch assembly 12 is adapted for being coupled to a trailer (not shown), such that the trailer is pulled behind the vehicle. Referring to FIG. 3, socket 14 is preferably a can-shaped socket extending below the bed 16 of a vehicle, wherein the bed includes an opening 18 below which the socket 14 is positioned. Socket 14 is essentially a hollow cylinder defined by an opening 20 and a wall 22. Socket 14 includes a cavity 26, see FIG. 5, which forms a depression in wall 22 of the socket, with cavity 26 preferably annular-shaped and spanning the diameter of the socket. Cavity 26 serves as an anchor point for restricting adapter 10 from being removed from socket 14. Thereby, adapter 10 is lockable within socket 14, whereby when adapter 10 is locked within socket 14 hitch assembly 12 is secured to vehicle.

Figure 4:
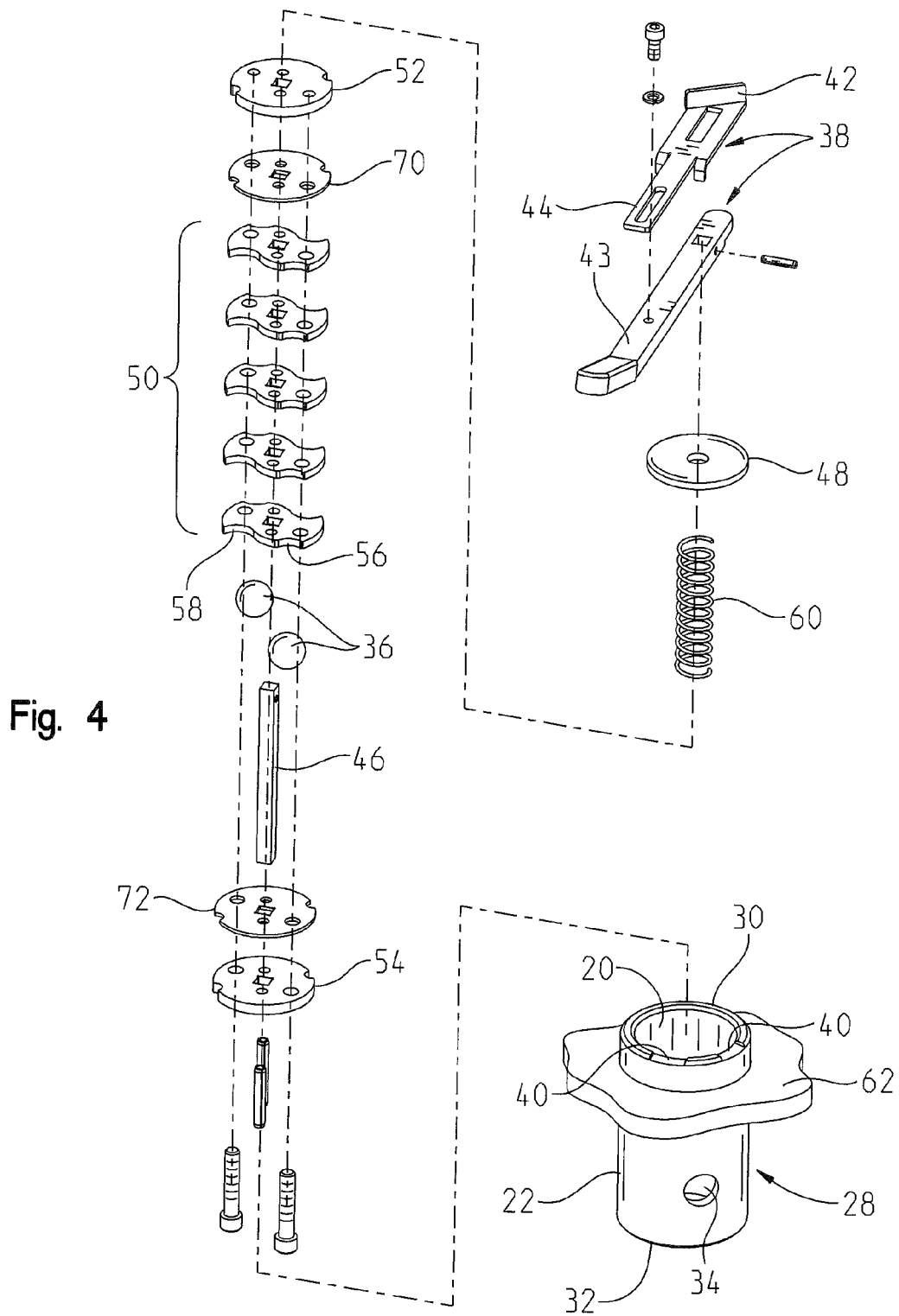
FIG. 4 is an exploded view of the adapter.
Figure 5:
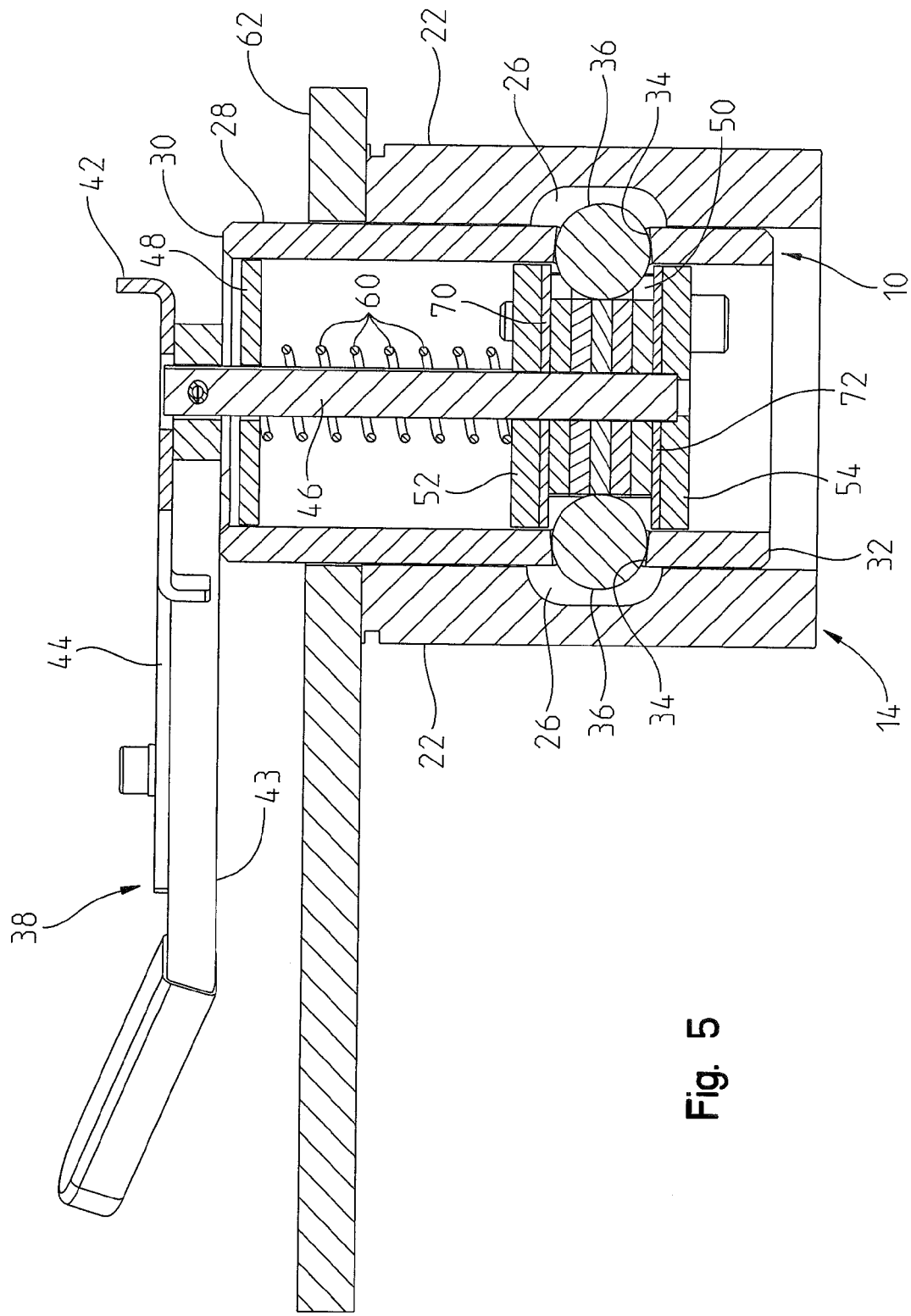
FIG. 5 is a cross-sectional side view of the adapter as seated in the socket and with the locking mechanism in the locked position.
Figure 6:
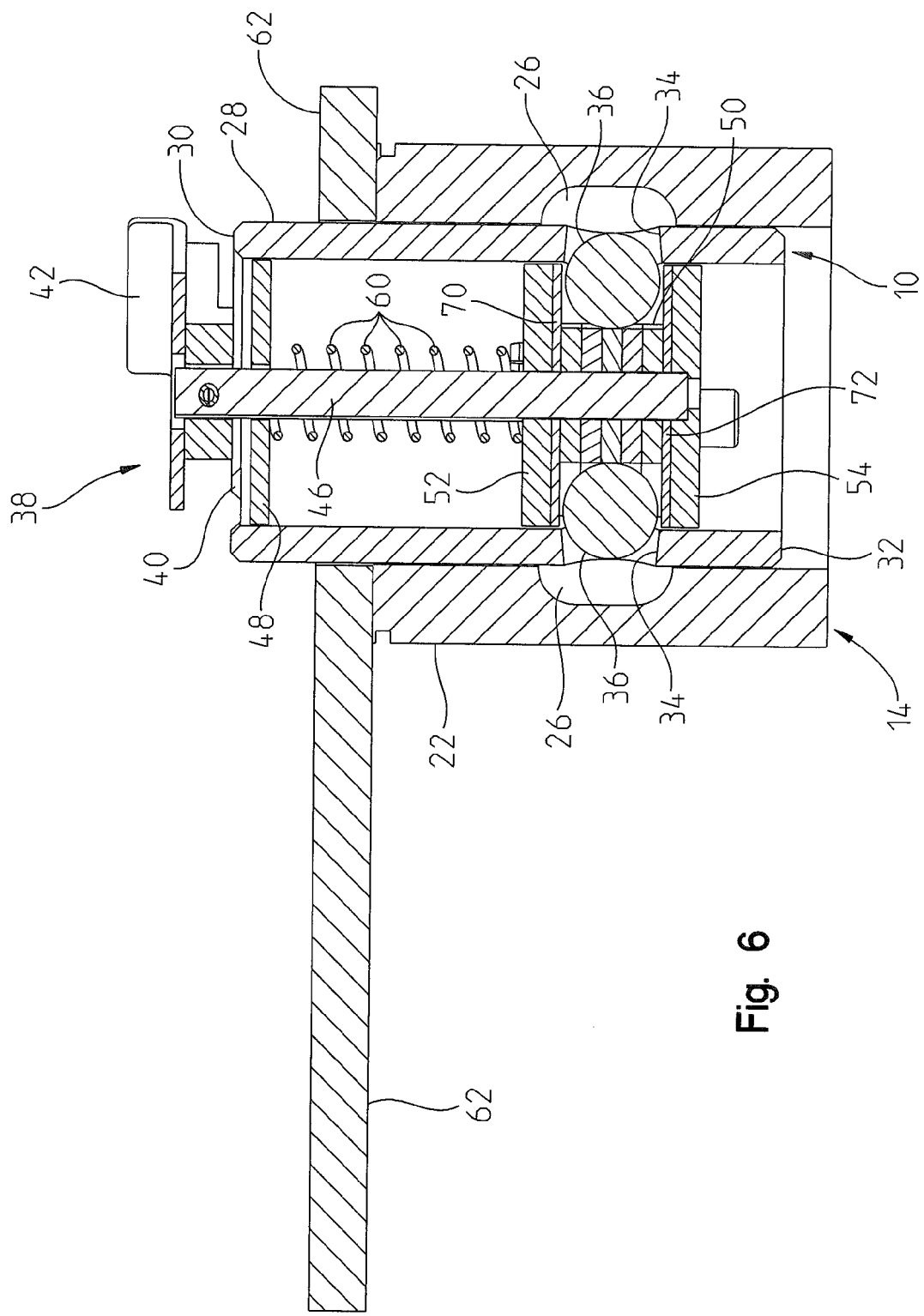
FIG. 6 is a cross-sectional side view of the adapter as seated in the socket with the locking mechanism in the unlocked position.
Figure 7:
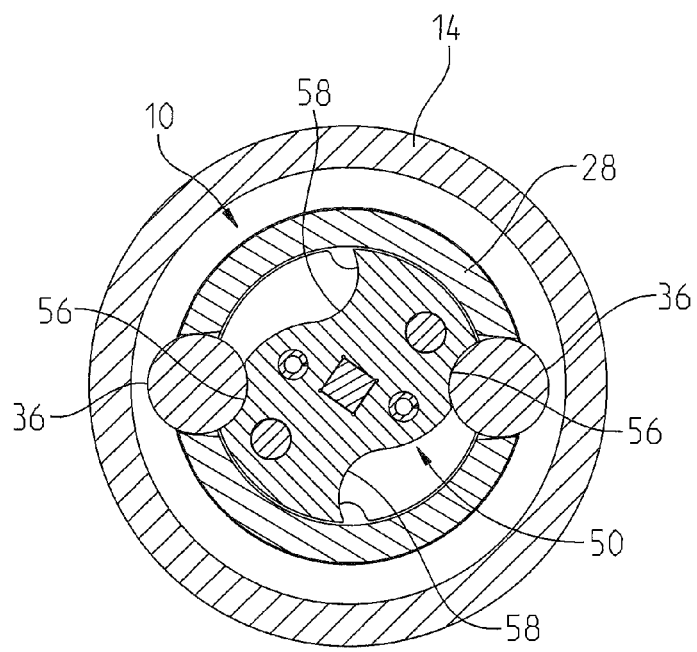
FIG. 7 is a cross-sectional top view of the adapter as seated in the socket with the locking mechanism in the locked position.
Figure 8:
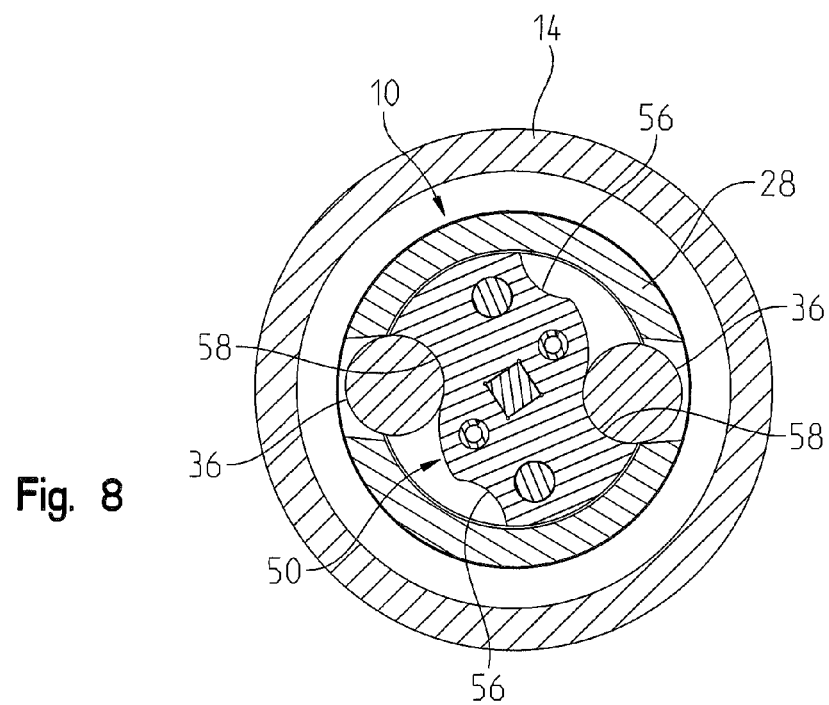
FIG. 8 is a cross-sectional top view of the adapter as seated in the socket with the locking mechanism in the unlocked position.
Figure 12:
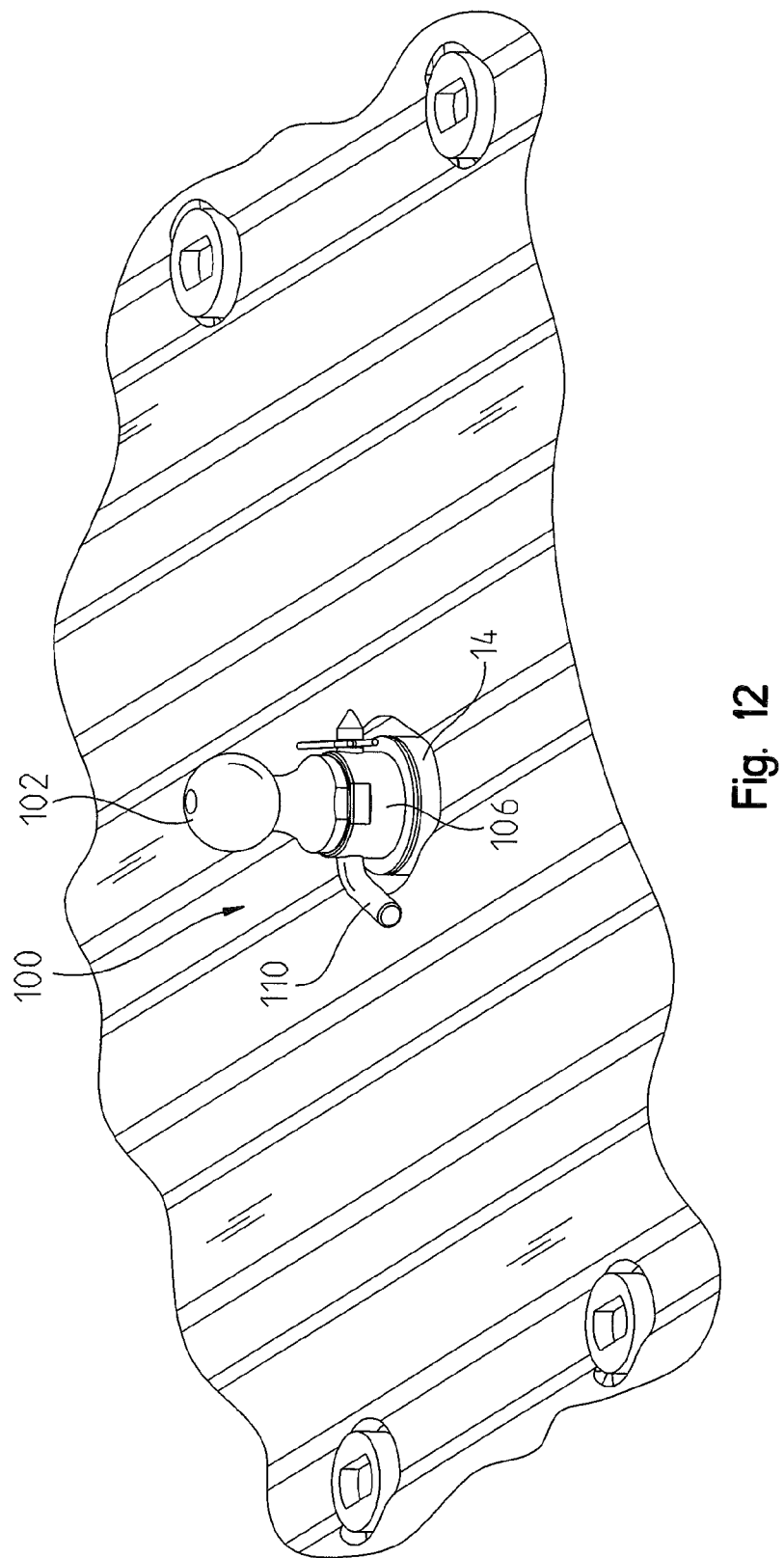
FIG. 12 is a perspective view of a ball-type adapter as seated in the socket.

Adapter 10 is adapted for being locked within socket 14. Referring now to FIGS. 4 and 5, adapter 10 is formed having a cylindrically-shaped collar 28 defined by a wall 22 extending between an open upper end 30 and an open lower end 32. Collar 28 includes an aperture 34 formed through the wall 22 and spaced intermediately between the upper end 30 and the lower end 32. An inner chamber is defined by wall 22. Aperture 34 is shaped as a truncated cone, having a smaller diameter proximate the outer surface of collar 28 and a larger diameter proximate the inner surface of the collar, and having a uniform change in diameter from one surface to the other. A ball 36 is positioned within adapter 10 such that the ball is advanced into aperture 34 when the locking mechanism is moved to the locked position, such that a portion of the ball protrudes out of collar 28 and into cavity 26, thereby preventing adapter 10 from being removed from socket 14, as shown in FIG. 5. The shape of aperture 34 provides the benefit of smooth operation of adapter 10. The present adapter 10 provides an aperture which is uniformly ramped such that ball 36 retreats from cavity 26 and rolls by gravity to the unlocked position, which provides a smooth motion when locking and unlocking adapter 10. It is also contemplated that the aperture 34 is a straight cylindrical hole. Another option is to have a restricted portion near the outer surface of collar 28.

Referring now to FIGS. 9 and 10, an arm 38 is adapted for actuating adapter 10 between the locked and the unlocked position. Arm 38 extends perpendicularly from opening 20. The rim of collar 28 is castellated, having notches 40 sized for accepting a portion of arm 38, such that a first notch holds arm 38 in the locked position and a second notch holds arm 38 in the unlocked position. Actuation between the locked and the unlocked position is achieved by pulling arm 38 axially away from collar 28 while rotating arm 38 radially to the desired position. Thereby, notches 40 function as safety devices to restrict arm 38 from moving between the unlocked and locked positions except when actuated by a user.

Figure 1:
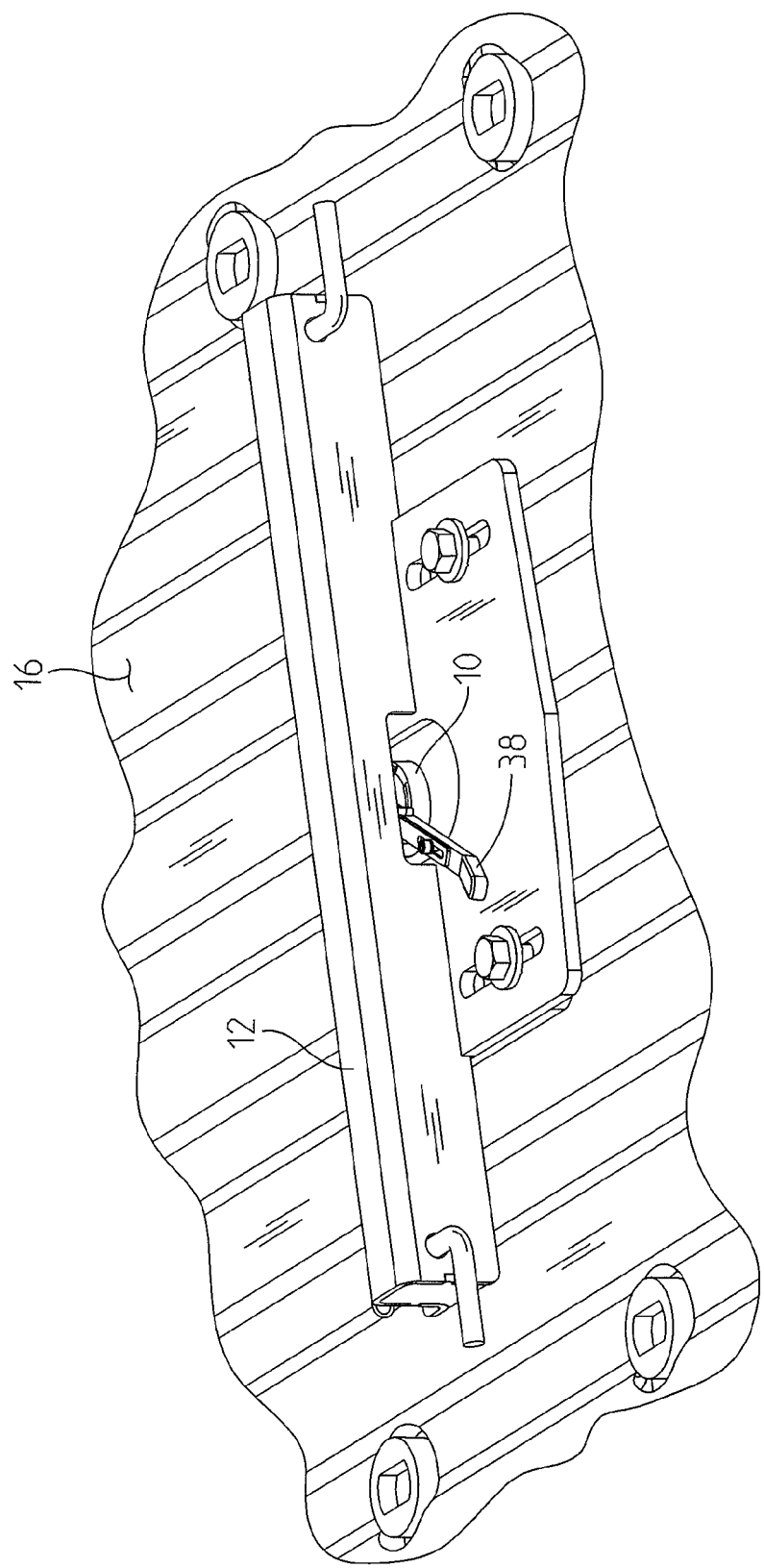
FIG. 1 is a perspective view of the adapter seated in the socket in the bed of a vehicle and having a portion of a hitch assembly mounted above the adapter.
Figure 2:
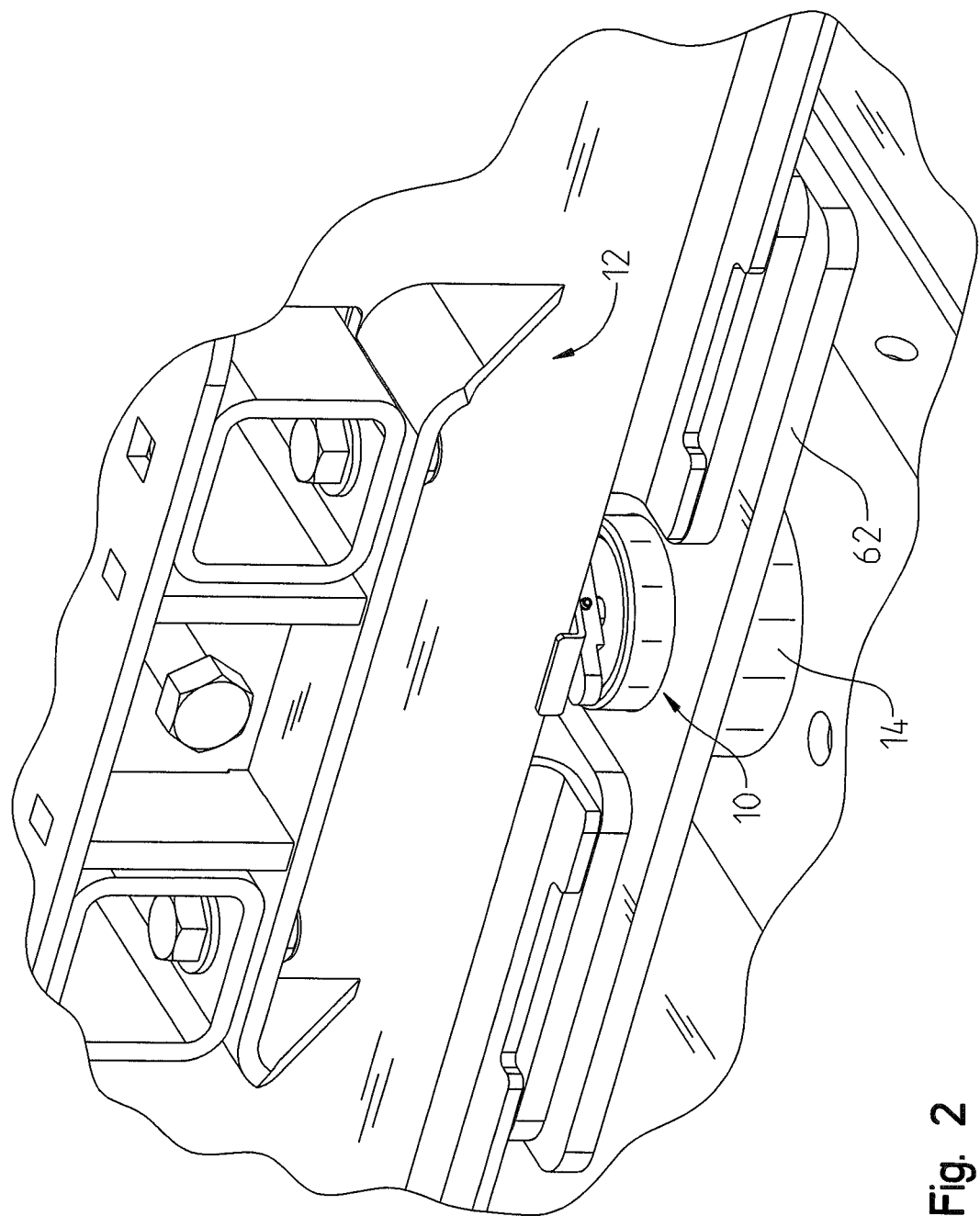
FIG. 2 is a perspective view of the adapter of FIG. 1 and showing a hitch mounted above the adapter.

A locking mechanism, or tab 42, extends upwardly from arm 38. Tab 42 is adapted for engaging a portion of hitch assembly 12, such that when hitch assembly 12 is mounted in the vehicle, tab 42 prevents rotation of arm 38, see FIG. 2. In this way, tab 42 serves as a second safety device to restrict rotation of arm 38. With hitch assembly 12 properly installed, tab 42 holds arm 38 in the locked position, thereby when hitch assembly 12 is installed, adapter 10 is held in socket 14. Only by removing hitch assembly 12 can arm 38 be rotated to the unlocked position. In this way, a user is unable to install hitch assembly 12 to the vehicle unless arm 38 is in the locked position, thereby tab 42 removes the opportunity for user error in installing hitch assembly 12. When arm 38 is in any position other than the locked position, hitch assembly 12 will not seat properly in the vehicle, and a user will not be able to attach the hitch assembly to the vehicle, which will only be cured by moving arm 38 to the locked position. As such, to properly mount the hitch assembly 12 to the vehicle, the arm 38 must be seated in the notch 40 corresponding to the locking position, such that tab 42 is positioned to allow the hitch assembly to be installed.

Arm 38 is formed having a base arm 43 and a sliding arm 44. Tab 42 is carried on sliding arm 44. Sliding arm is slidingly mounted to base arm 43 such that sliding arm 44 is movable relative base arm 43, such that tab 42 is longitudinally positionable in a number of positions relative collar 28 to allow for tab 42 to be custom-positioned to fit with a given hitch assembly 12. In other words, tab 42 is movable by sliding arm 44 so that tab 42 can serve its locking function when used in combination with hitch assemblies of varying dimensions.

Figure 13:
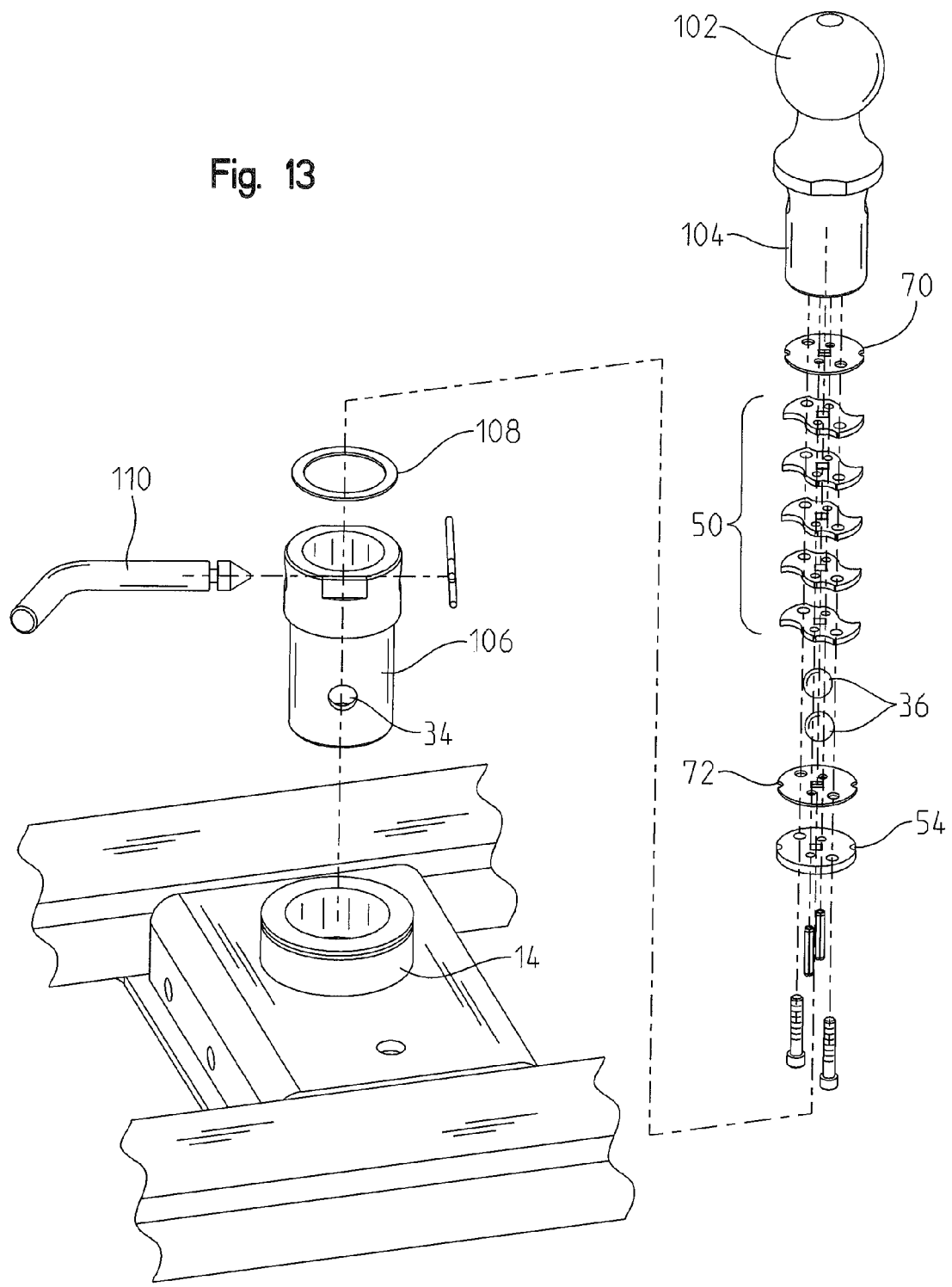
FIG. 13 is an exploded view of the adapter of FIG. 12.
Figure 14:
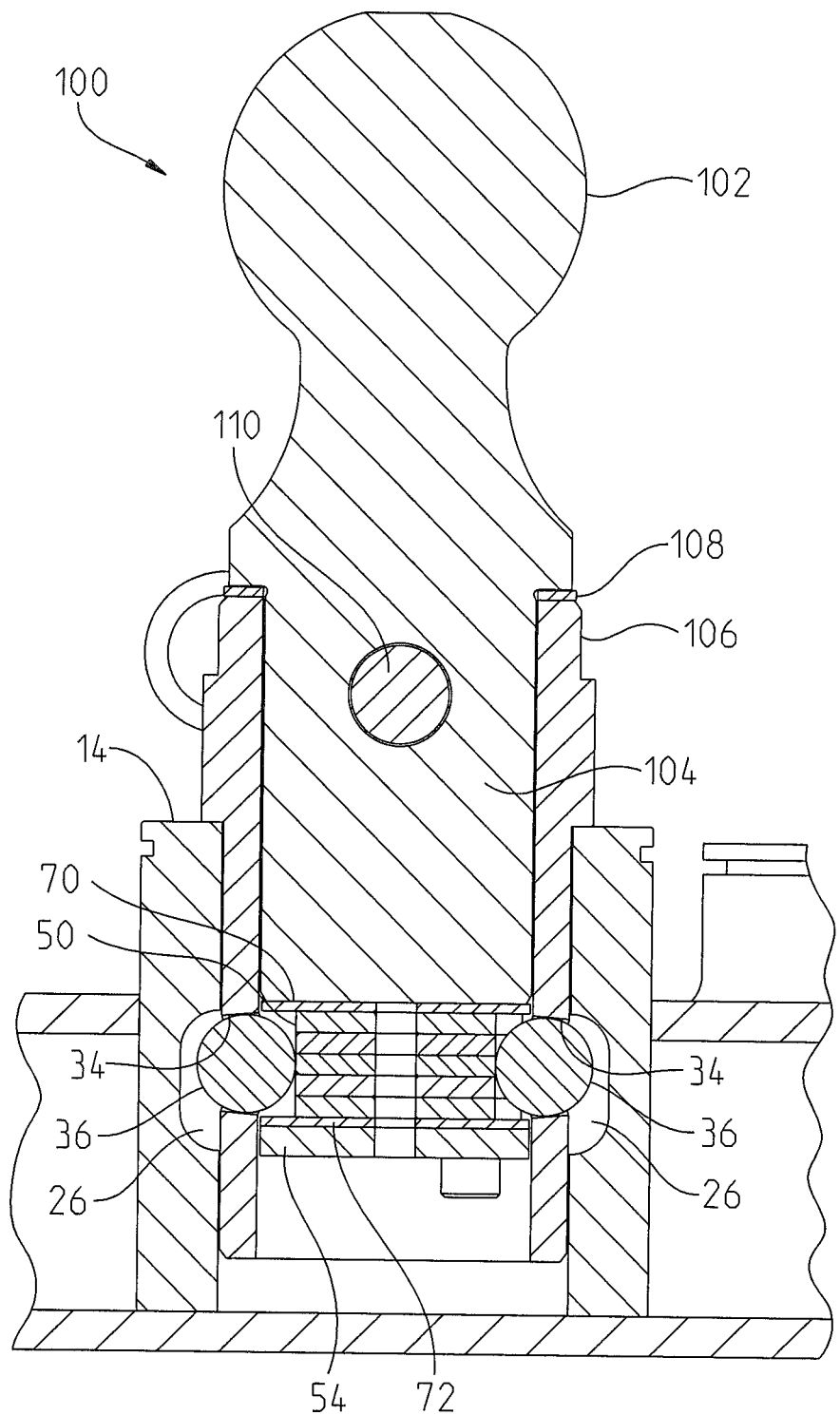
FIG. 14 is a cross-sectional side view of the adapter of FIG. 12 with the locking mechanism in the locked position.
Figure 15:
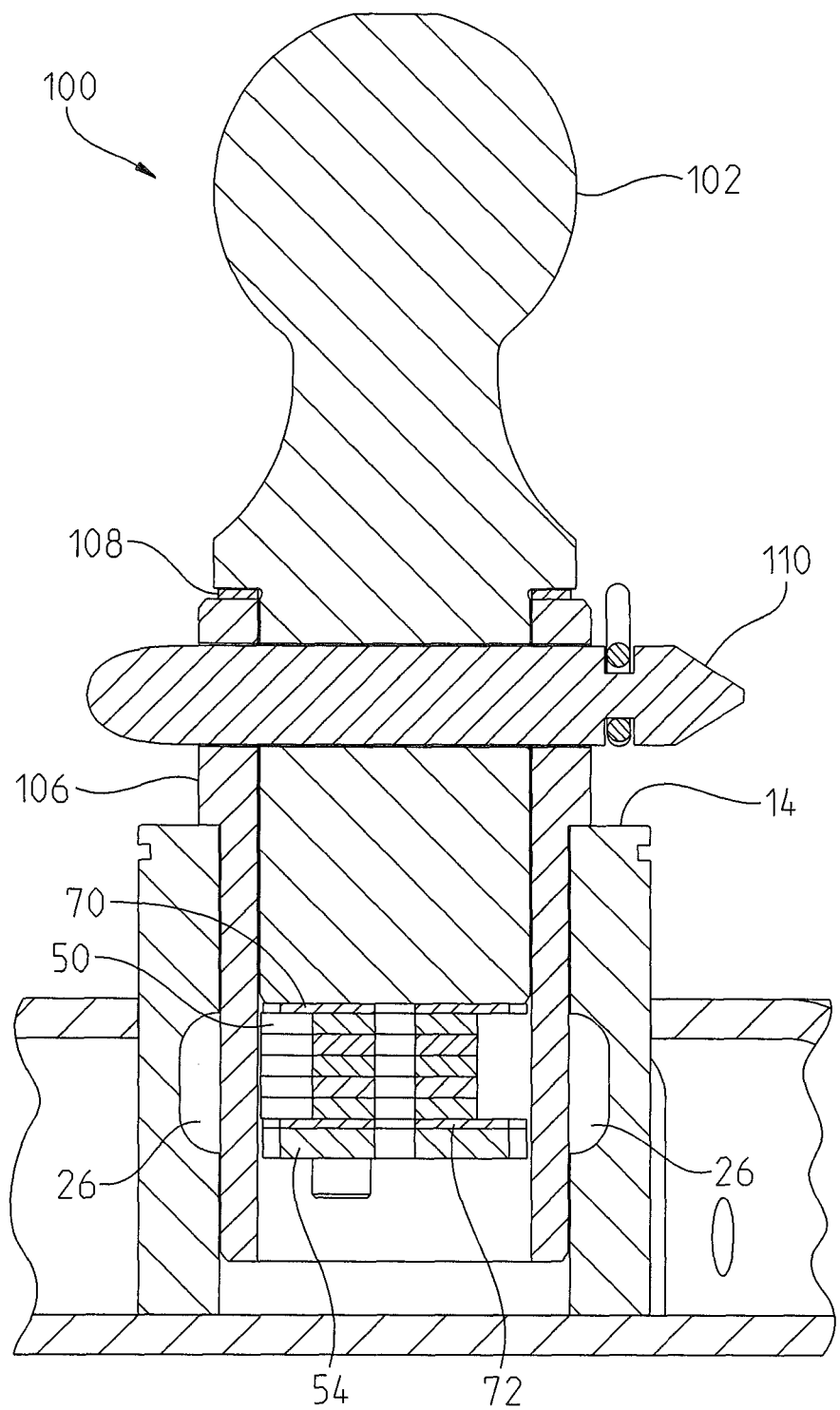
FIG. 15 is a cross-sectional end view of the adapter and socket of FIG. 14 and showing a cotter pin locking the hitch to the adapter.

Referring to FIGS. 4 and 5, a shaft 46 extends from arm 38 into the inner chamber of collar 28. Shaft 46 serves as the axis about which arm 38 rotates. A head plate 48 includes an aperture through which shaft 46 passes, with head plate 48 offset from opening 20. Head plate 48 is welded to or otherwise anchored to collar 28. A cam, such as an S-cam 50, is carried on shaft 46 and is sandwiched between an upper plate 52 and a lower plate 54. Upper plate 52 is welded to or otherwise anchored to shaft 46. Ball 36 is carried between upper plate 52 and lower plate 54, such that plates 52, 54 serve as upper and lower boundaries for ball 36. S-cam 50 includes an "S" shaped cutout defined by a shallow recess 56 and a deep recess 58. The locked position is defined by ball 36 cradled adjacent shallow recess 56. The unlocked position is defined by ball 36 cradled adjacent deep recess 58. Rotation of arm 38 corresponds to a rotation of S-cam 50, which causes ball 36 to travel between shallow recess 56 and deep recess 58. It is contemplated that S-cam 50 is formed from a series of stacked plates, with upper plate 52, the plates forming S-cam 50 and lower plate 54 held in a stacked relationship by fasteners, such as a bolt. It is contemplated that upper plate 52 and lower plate 54 are formed from a low-friction material, such as plastic, to allow ball 36 to roll smoothly between the locked and the unlocked positions. In one embodiment, low friction plates 70, 72 contact ball 36, with one low friction plate 70 sandwiched between upper plate 52 and S-cam 50 and other low friction plate 72 sandwiched between lower plate 54 and S-cam 50. Each of head plate 48, upper plate 52, and low friction plates 70, 72 include an aperture passing through the respective center for accepting shaft 46. Lower plate 54 includes a stepped-aperture such that shaft 46 is seated on lower plate 54. The aperture through head plate 48 is such that shaft 46 is rotatable relative the head plate. The apertures through S-cam 50, low friction plates 70, 72, upper plate 52 and lower plate 54 are such that shaft 46 causes these plates to rotate. It is contemplated that the shaft 46 includes a hitch ball 102 as is shown in FIG. 13

A spring 60 is a coil spring which includes coils, with at least a portion of shaft 46 positioned radially inward of the coils. With head plate 48 attached to collar 28 and upper plate 52 attached to shaft 46, spring 60 braces against head plate 48 and urges upper plate 52 and shaft 46 down and away from head plate 48. Spring 60 urges arm 38 toward collar 28, thereby spring 60 holds arm 38 in notch 40. Pulling arm 38 up and away from collar 28 compresses spring 60 and allows arm 38 to clear notch 40 thereby freeing arm 38 to be rotated about shaft 46 to another notch 40, thereby moving the locking mechanism between the locked and the unlocked position. Spring 60 is sandwiched between head plate 48 and upper plate 52.

Adapter 10 is used in combination with a hitch assembly 12. In one embodiment, hitch assembly 12 includes a mounting plate 62 which is formed integrally around adapter 10 and serves as a base on to which a fifth-wheel can be mounted.

Referring now to FIGS. 12-15, in another embodiment, an adapter 100 includes a ball 102 for making mating contact with the tongue of a trailer (not shown). In this embodiment, numbers are reused from the embodiment shown in FIGS. 1-11 where the structure of the given part is substantially the same between the two embodiments. Adapter 100 includes an extension member 104 extending below the ball and which is sheathed within a collar 106. S-cam 50 is positioned below extension member 104, and optionally includes a low friction plate 70 spaced between the extension member 104 and the S-cam 50. The collar 106 includes one or more apertures 34 which facilitate balls 36 locking collar 106 in socket 14. Ball 102 is rotatable relative collar 106 to move adapter 10 between the locked and the unlocked position, wherein rotation of the ball 102 causes S-cam 50 to rotate moving balls 36 in and out of apertures 34. When in the locked position, a cotter pin 110 is slidable through apertures in both collar 106 and extension member 104, thereby holding adapter 100 in the locked position. S-cam 50 is fastened to extension member 104 by one or more fasteners, thereby S-cam 50 is held in fixed rotational contact with extension member 104. A low friction plate is optionally spaced below S-cam 50. A lower plate 54 is positioned below the S-cam 50, with the S-cam sandwiched between lower plate 54 and extension member 104. A washer 108 is spaced between collar 106 and ball 102, wherein the washer serves as a bearing to allow ball 102 and extension member 104 to rotate relative collar 106. In this embodiment, with the cotter pin 110 in place, the user will know the adapter 100 is in the locked position since the apertures on the collar 106 and extension member 104 will only align when in the locked position, thereby preventing improper installation. The ball 36, 102 can also be referred to as a follower.

Another embodiment as shown in FIGS. 16 and 17, the follower could be a captured link 130 that pivots and slides between a locked and unlocked position. FIG. 16 shows the locked position and FIG. 17 shows the unlocked position. The link 130 is pivotally attached to the rotatable member 134 at pivot point 132. The pivot point 132 remains at a constant radius from the center of the rotatable member and serves as a backstop to positively move the link between the locked position and the unlocked position. As the pivot point 132 rotates around the center, the link 130 begins to become pulled in as the pivot moves from being closer to the aperture 34 to farther from the aperture 34. The link 130 as shown in FIG. 17 is in the locked position. The apertures 34 are larger on the inside to allow the link 130 to slide and pivot as it retracts. A lock stop 148 prevents excessive rotation of the rotatable member 134 once the user has rotated it into the locked position. An unlock stop 146 prevents excessive rotation of the rotatable member 134 once the user has rotated it into the unlocked position.

Figure 18:
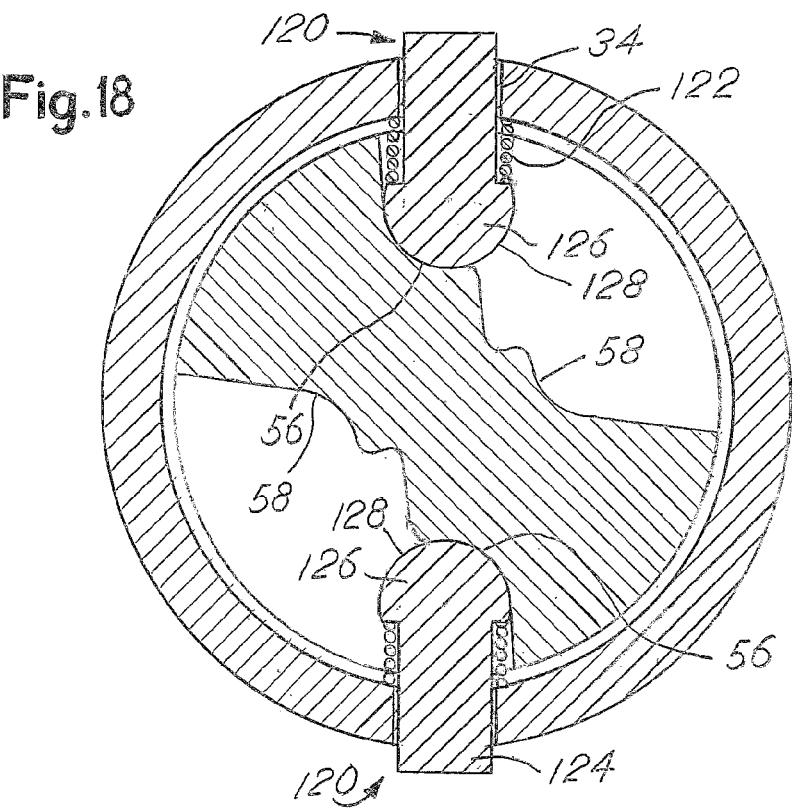
FIG. 18 is a cross-sectional view of an alternate embodiment in the locked position.
Figure 19:
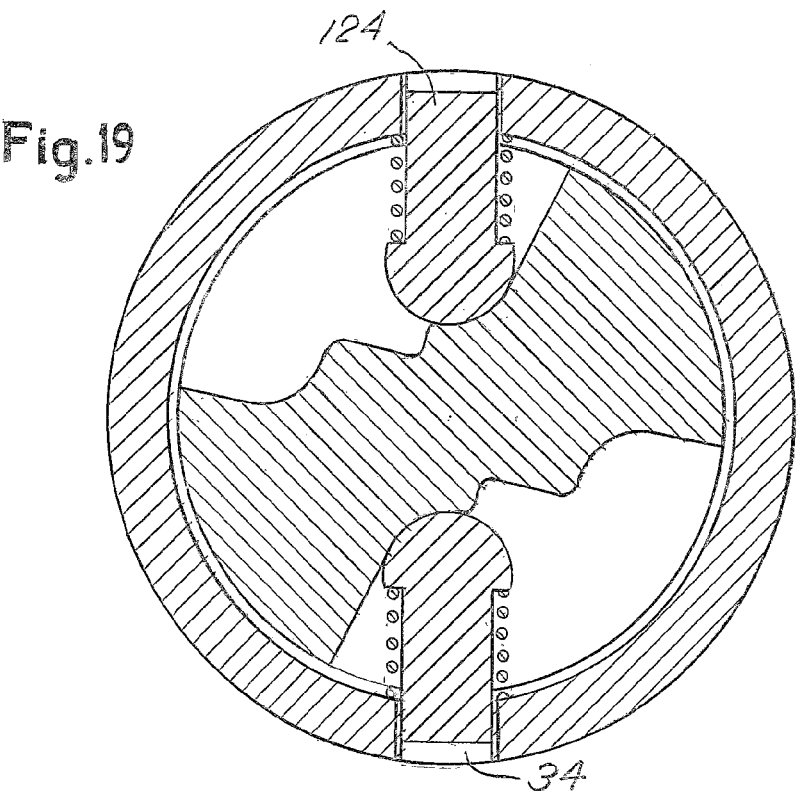
FIG. 19 is a cross sectional view of the embodiment of FIG. 18 in the unlocked position.

Instead of a ball 36, other shapes are possible. For instance, if the aperture 34 is a straight cylindrical hole, the ball 36 would be able to fall out and become lost. Another embodiment as shown in FIGS. 18 and 19, a rivet-shaped follower 120 could be used to lock and unlock the adapter 10. FIG. 18 shows the locked position and FIG. 19 shows the unlocked position. The rivet has a straight shaft portion 124 and a head portion 126 that is larger than the aperture 34. The head portion 126 has a sliding surface 128 that would be held in biased contact with the outside surface of the S-cam 56, 58 using a spring 122 between the head portion 126 and the collar 28. The spring 122 ensures that the shaft portion 124 retracts when the S-cam is moved from the locked position to the unlocked position.

Figure 20:
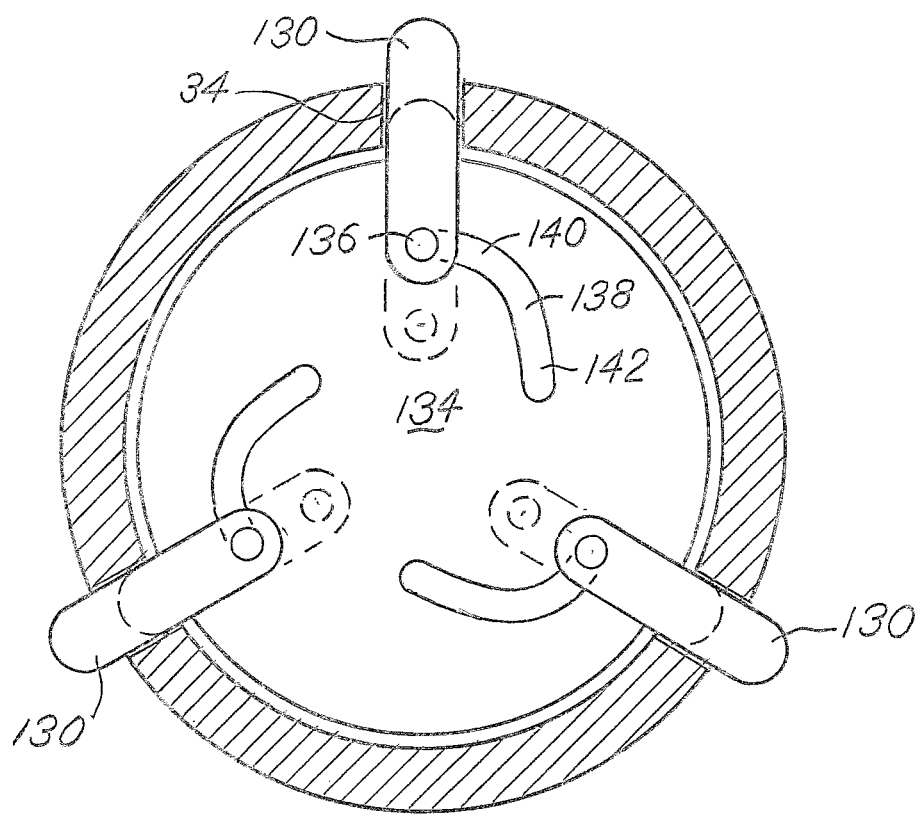
FIG. 20 is a cross-sectional view of an alternate embodiment in the locked position.

Another embodiment as shown in FIG. 20, the captured link 130 has a pin 136 that slides in a groove 138. The groove 138 has a close portion 140 and a far portion 142. The far portion 142 locates the pin 136 and link 130 farther from the center and therefore through the aperture 34 when the rotatable member 134 is in the locked position. The close portion 140 locates the pin 136 and link 130 closer to the center and therefore partially recessed into the aperture 34 when the rotatable member 134 is in the unlocked position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An adapter serving as an anchor point for securing a trailer or other object to a vehicle having a socket with a first inside diameter, said socket including a cavity with a second inside diameter, said second inside diameter larger than said first inside diameter, said adapter comprising:

a collar formed having a wall including an inner surface and an outer surface, said inner surface defining an inner chamber, said outer surface adapted to be received by said socket within said first inner diameter;

an aperture formed in said wall of said collar extending through said wall from said inner surface of said wall to said outer surface of said wall, said aperture being larger at said inner surface of said wall and smaller at said outer surface of said wall;

an S-cam carried within said inner chamber of said collar, said S-cam being rotatable about a central axis with respect to said inner chamber and including a deep recess and a shallow recess within an outer surface of said S-cam;

a follower retained in said aperture and moveable between a retracted position and an extended position wherein said follower protrudes beyond said outer surface of said wall, said follower movable along said outer surface of said S-cam between an unlocked position corresponding to said follower being located in said deep recess and a locked position corresponding to said follower being in said shallow recess, whereby said follower protrudes into said cavity when said follower is in said shallow recess and said collar is in said socket; and a locking member adapted to selectively fix said S-cam from rotation with respect to said collar.

2. The adapter of claim 1, a shaft affixed to said S-cam, said shaft rotatable with said S-cam between said locked position and said unlocked position, said locked position being where said follower is located in said extended position, said unlocked position being where said follower is in said retracted position.

3. The adapter of claim 2, and a second aperture formed in said wall of said collar, said locking member adapted to extend through said second aperture and engage said shaft to selectively fix said shaft from rotation when said shaft is in its locked position.

4. The adapter of claim 2, wherein said S-cam is formed from a series of stacked plates.

5. An adapter for selectively fixing to a socket, said socket having a first inside surface, and a second inside surface defining a cavity, said second inside surface extending outwardly of said first inside surface, said adapter comprising:
- a collar having a wall including an inner surface and an outer surface, said inner surface defining an inner chamber, said outer surface smaller than first inside surface;
- a cam rotatable with respect to said collar between a locked and an unlocked position, said cam having a shallow recess and a deep recess on an outer surface of said cam, said cam carried within said inner chamber;
- a shaft fitted to and extending from said cam and rotatable therewith;
- an aperture formed in said wall of said collar extending through said wall from said inner surface to said outer surface, said aperture being smaller near said outer surface and larger near said inner surface;
- a follower retained inside said aperture, said follower being smaller than said aperture at said inner surface and larger than said aperture at said outer surface, said follower movable along said cam between said shallow recess and said deep recess, said locked position defined by said follower adjacent to said shallow recess and extending into said cavity, said unlocked position defined by said follower adjacent to said deep recess; and
- a locking member adapted to restrict rotation of said cam when said cam is in said locked position.

6. The adapter of claim 5, wherein said cam is formed from a series of stacked plates.

7. The adapter of claim 5, and a second aperture formed in said wall of said collar, said locking member adapted to extend through said second aperture and engage said shaft when said cam is in said locked position.

\* \* \* \* \*